United States Patent [19]
Gardner et al.

[11] Patent Number: 4,517,321
[45] Date of Patent: May 14, 1985

[54] PREIMPREGNATED REINFORCEMENTS AND HIGH STRENGTH COMPOSITES THEREFROM

[75] Inventors: Hugh C. Gardner, Somerville; Michael J. Michno, Jr.; George L. Brode, both of Bridgewater, all of N.J.

[73] Assignee: Union Carbide Corporation, Danbury, Conn.

[21] Appl. No.: 496,504

[22] Filed: May 20, 1983

[51] Int. Cl.³ .................. C08K 7/02; C08K 7/10; C08K 7/14; C08L 63/00
[52] U.S. Cl. .................. 523/400; 523/445; 523/457; 523/459; 523/468; 428/413; 528/124
[58] Field of Search .......... 523/400, 445, 468, 457, 523/459; 428/413; 528/124

[56] References Cited

U.S. PATENT DOCUMENTS

| | | |
|---|---|---|
| 3,530,087 | 9/1970 | Hayes et al. . |
| 3,676,200 | 7/1972 | Rembold et al. . |
| 3,784,433 | 1/1974 | Garnish et al. . |
| 3,810,785 | 5/1974 | Dominic et al. . |
| 3,950,451 | 4/1976 | Suzuki et al. ............ 528/124 |
| 4,385,154 | 5/1983 | Cassat et al. ............ 428/413 |
| 4,397,999 | 8/1983 | Ahne et al. ............ 428/413 |

FOREIGN PATENT DOCUMENTS

| | | |
|---|---|---|
| 577114 | 6/1959 | Canada ............ 528/124 |
| 50-89695 | 7/1975 | Japan ............ 428/413 |
| 53-98400 | 8/1978 | Japan . |
| 56-11584 | 3/1981 | Japan . |
| 78042 | 5/1975 | Poland . |
| 804294 | 11/1958 | United Kingdom ............ 528/124 |
| 476296 | 2/1976 | U.S.S.R. . |

OTHER PUBLICATIONS

Handbook of Composites, Edited by George Lubin, pp. 452–455.

Primary Examiner—Ronald W. Griffin
Attorney, Agent, or Firm—Steven T. Trinker

[57] ABSTRACT

The tensile properties and compressive strength of composites comprising epoxy resins and structural fibers are improved by the inclusion of a novel class of polynuclear aromatic diamine hardners exemplified by 4,4'-bis-(4-aminophenoxy) diphenyl sulfone and its analogs.

37 Claims, No Drawings

PREIMPREGNATED REINFORCEMENTS AND HIGH STRENGTH COMPOSITES THEREFROM

BACKGROUND OF THE INVENTION

Advanced composites are high strength, high modulus materials which are finding increasing use as structural components in aircraft, automotive, and sporting goods applications. Typically they comprise structural fibers such as carbon fibers in the form of woven cloth or continuous filaments embedded in a thermosetting resin matrix.

Most advanced composites are fabricated from prepreg, a ready-to-mold sheet of reinforcement impregnated with uncured or partially cured resin. Resin systems containing an epoxide resin and aromatic amine hardener are often used in prepreg since they possess the balance of properties required for this composite fabrication process. State of the art epoxy/carbon fiber composites have high compressive strengths, good fatigue characteristics, and low shrinkage during cure. However, since most epoxy formulations used in prepreg are brittle, these composites have low toughness, which results in poor impact resistance and tensile properties which do not fully translate the properties of the reinforcing fiber. Thus there is a need for resin systems which afford composites with improved tensile properties in combination with the compressive strengths typical of this class of materials.

THE INVENTION

It has now been found that a composition which contains a specific group of hardeners and epoxy compounds when combined with structural fibers produces composites which have improved tensile properties and high compressive strengths.

The composition of this invention comprises:
(a) a diamine hardener.
(b) an epoxy resin containing two or more 1,2-epoxide groups per molecule, and
(c) a structural fiber.

The diamine hardeners which are used in this invention are represented by the following general formula:

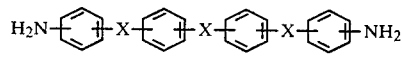

wherein the X's are independently selected from a direct bond, O, S, $SO_2$, CO, COO, $C(CF_3)_2$, $C(R_1R_2)_2$ wherein $R_1$ and $R_2$ are independently hydrogen or alkyl of 1 to 4 carbon atoms.

The preferred diamine hardeners are selected from one or more of the following compounds:

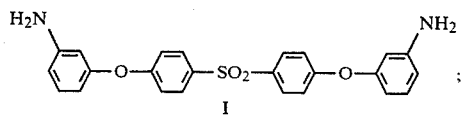

I

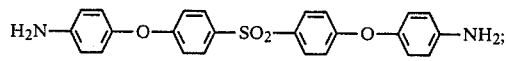

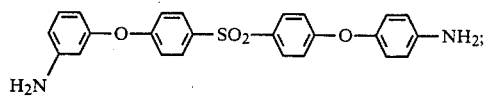

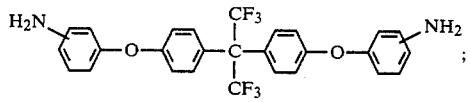

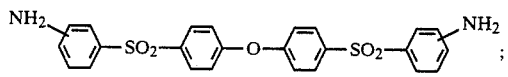

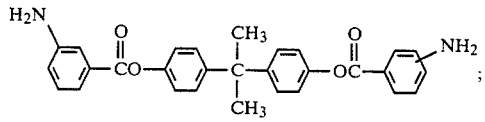

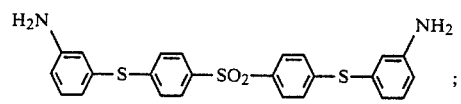

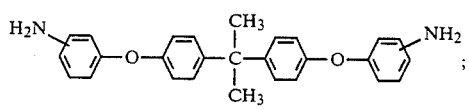

These diamines may be used in combination with conventional aromatic diamines. Examples of conventional diamines include 4,4'-diaminodiphenyl ether. 4,4'-diaminodiphenyl methane. 4,4'-diaminodiphenyl sulfone. 3,3'-diaminodiphenyl sulfone, m-phenylenediamine, p-phenylenediamine, 4,4'-diaminodiphenylpropane, 4,4'-diaminodiphenyl sulfide, 1,4-bis(p-aminophenoxy)benzene, 1,4-bis(m-aminophenoxy)benzene, 1,3-bis-(m-aminophenoxy)benzene, and 1,3-bis(p-aminophenoxy) benzene.

The epoxy resins which may be used herein contain two or more epoxy groups having the following formula:

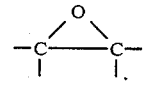

The epoxy groups can be terminal epoxy groups or internal epoxy groups. The epoxides are of two general types: polyglycidyl compounds or products derived from epoxidation of dienes or polyenes. Polyglycidyl compounds contain a plurality of 1,2-epoxide groups derived from the reaction of a polyfunctional active hydrogen containing compound with an excess of an epihalohydrin under basic conditions. When the active hydrogen compound is a polyhydric alcohol or phenol, the resulting epoxide composition contains glycidyl ether groups. A preferred group of polyglycidyl compounds are made via condensation reactions with 2,2-bis(4-hydroxyphenyl) propane, also known as bisphenol A, and have structures such as II,

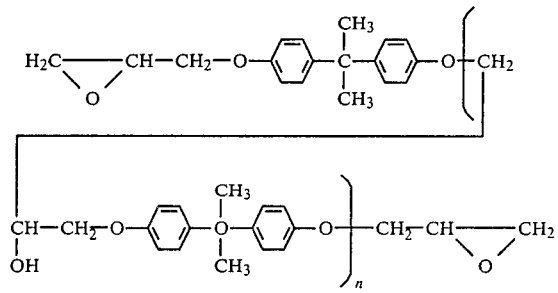

where n has a value from about 0 to about 15. These epoxides are bisphenol-A epoxy resins. They are available commercially under the trade names such as "Epon 828," "Epon 1001", and "Epon 1009", from Shell Chemical Co. and as "DER 331", "DER 332", and "DER 334" from Dow Chemical Co. The most preferred bisphenol A epoxy resins have an "n" value between 0 and 10.

Polyepoxides which are polyglycidyl ethers of 4,4'-dihydroxydiphenyl methane, 4,4'-dihydroxydiphenyl sulfone, 4,4'-biphenol, 4,4'-dihydroxydiphenyl sulfide, phenolphthalein, resorcinol, 4.2'-biphenol, or tris(4-hydroxyphenyl) methane and the like, are useful in this invention. In addition, EPON 1031 (a tetraglycidyl) derivative of 1,1,2,2-tetrakis(hydroxyphenyl)ethane (obtained from Shell Chemical Company), and Apogen 101, (a methylolated bisphenol A resin obtained from Schaefer Chemical Co.) may also be used. Halogenated polyglycidyl compounds such as D.E.R. 580 (a brominated bisphenol A epoxy resin obtained from Dow Chemical Company) are also useful. Other suitable epoxy resins include polyepoxides prepared from polyols such as pentaerythritol, glycerol, butanediol or trimethylolpropane and an epihalohydrin.

Polyglycidyl derivatives of phenol-formaldehyde novolaks such as III where n=0.1 to 8 and cresol-formaldehyde novolaks such as IV where n=0.1 to 8 are also useable.

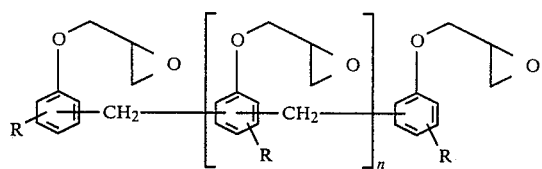

III R = H
IV R = CH₃

The former are commercially available as D.E.N. 431, D.E.N. 438, and D.E.N. 485 (obtained from Dow Chemical Company). The latter are available as, for example, ECN 1235, ECN 1273, and ECN 1299 (obtained from Ciba Geigy Corporation, Ardsley, NY). Epoxidized novolaks made from bisphenol A and formaldehyde such as SU-8 (obtained from Celanese Polymer Specialties Company, Louisville, KY) are also suitable.

Other polyfunctional active hydrogen compounds besides phenols and alcohols may be used to prepare the polyglycidyl adducts of this invention. These include amines, aminoalcohols and polycarboxylic acids.

Adducts derived from amines include N,N-diglycidyl aniline, N,N-diglycidyl toluidine, N,N,N',N'-tetraglycidylxylylene diamine, N,N,N',N'-tetraglycidyl-bis(-methylamino)-cyclohexane, N,N,N',N'-tetraglycidyl-4,4'-diaminodiphenyl methane, N,N,N',N'-tetraglycidyl-3,3'-diaminodiphenyl sulfone, and N,N'-dimethyl-N,N'-diglycidyl-4,4'-diaminodiphenyl methane. Commercially available resins of this type include Glyamine 135 and Glyamine 125 (obtained from F.I.C. Corporation, San Francisco, CA.) Araldite MY-720 (obtained from Ciba Geigy Corporation) and PGA-X and PGA-C (obtained from The Sherwin-Williams Co., Chicago, Ill.

Suitable polyglycidyl adducts derived from amino alcohols include O,N,N-triglycidyl-4-aminophenol, available as Araldite 0500 or Araldite 0510 (obtained from Ciba Geigy Corporation). Also, O,N,N-triglycidyl-3-amino phenol may be used.

Also suitable for use herein are the glycidyl esters of carboxylic acids. Such glycidyl esters include, for example, diglycidyl phthalate, diglycidyl terephthalate, diglycidyl isophthalate, and diglycidyl adipate. There may also be used polyepoxides such as triglycidyl cyanurates and isocyanurates, N,N-diglycidyl oxamides, N,N'-diglycidyl derivatives of hydantoins such as "XB 2793" (obtained from Ciba Geigy Corporation), diglycidyl esters of cycloaliphatic dicarboxylic acids, and polyglycidyl thioethers of polythiols.

Other epoxy-containing materials are copolymers of acrylic acid esters of glycidol such as glycidyl acrylate and glycidyl methacrylate with one or more copolymerizable vinyl compounds. Examples of such copolymers are 1:1 styrene-glycidyl methacrylate, 1:1 methyl methacrylate-glycidyl acrylate and 62.5:24:13.5 methyl methacrylate:ethyl acrylate:glycidyl methacrylate.

Silicone resins containing epoxy functionality, e.g., 2,4,6,8,10-pentakis [3-(2,3-epoxypropoxy)propyl]-2,4,6,8,10-pentamethylcyclopentasiloxane and the diglycidyl ether of 1,3-bis-(3-hydroxypropyl)tetramethyldisiloxane are also useable.

The second group of epoxy resins is prepared by epoxidation of dienes of polyenes. Resins of this type include bis(2,3-epoxycyclopentyl) ether, V;

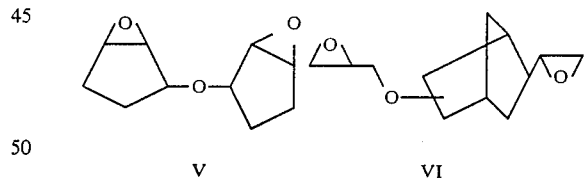

V  VI copolymers of V with ethylene glycol which are described in U.S. Pat. No. 3,398,102, 5(6)-glycidyl-2-(1,2-epoxyethyl)bicyclo[2.2.1] heptane, VI; and dicyclopentadiene diepoxide. Commercial examples of these types of epoxides include vinycyclohexane dioxide, e.g., "ERL-4206" (obtained from Union Carbide Corp.), 3,4-epoxycyclohexylmethyl 3,4-epoxycyclohexane carboxylate, e.g., "ERL-4221" (obtained from Union Carbide Corp.) 3,4-epoxy-6-methylcyclohexylmethyl 3,4-epoxy-6-methylcyclohexane carboxylate, e.g., "ERL-4201" (obtained from Union Carbide Corp.), bis(3,4-epoxy-6-methylcyclo-hexylmethyl) adipate, e.g., "ERL-4289" (obtained from Union Carbide Corp.), dipentene dioxide, e.g., "ERL-4269" (obtained form Union Carbide Corp.) 2-(3,4-epoxycyclohexyl-5,5-spiro-3,4-epoxy)cyclohexanemetadioxane, e.g., "ERL- 4234" (obtained from Union Carbide Corp.) and epoxidized poly-butadiene, e.g., "Oxiron 2001" (obtained from FMC Corp.)

Other suitable cycloaliphatic epoxides include those described in U.S. Pat. Nos. 2,750,395; 2,890,194; and 3,318,822 which are incorporated herein by reference, and the following:

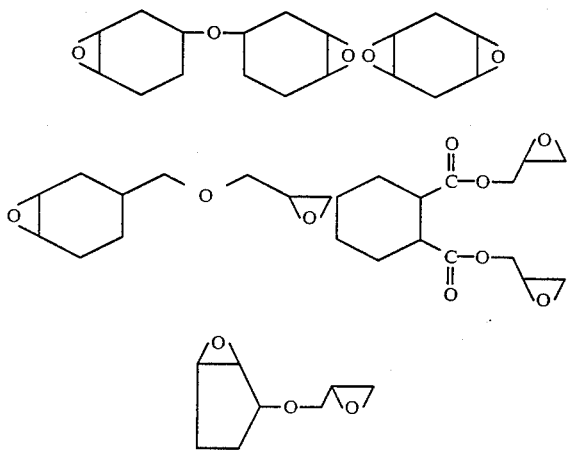

Other suitable epoxides include:

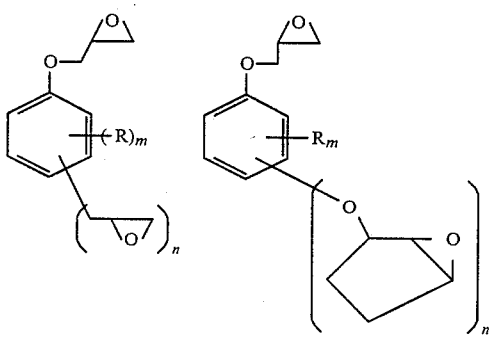

where n is 1 to 4, m is (5-n), and R is H, halogen, or $C_1$ to $C_4$ alkyl.

The preferred epoxy resins are bis-(2,3-epoxycyclopentyl) ether, bisphenol A epoxy resins of formula II where n is between 0 and 5, epoxidized novolak resins of formulas III and IV where n is between 0 and 3, mixtures of bis (2,3-epoxycyclopentyl) ether with II, III, or IV, and N, N, N',N'-tetraglycidyl 4,4'-diaminodiphenyl methane.

The composition may additionally contain an accelerator to increase the rate of cure. Accelerators which may be used herein include Lewis acid:amine complexes such as $BF_3$.monoethylamine, $BF_3$.piperdine, $BF_3$.2-methylimidazole; amines, such as imidazole, 4-ethyl-2-methylimidazole, 1-methylimidazole, 2-methylimidazole and N,N-dimethylbenzylamine; acid salts of tertiary amines, such as the p-toluene sulfonic acid-imidazole complex; and dicyandiamide.

The structural fibers which are useful in this invention include carbon, graphite, glass, silicon carbide, poly(benzothiazole), poly(benzimidazole), poly(benzoxazole), alumina titania, and other ceramic fibers, boron, and aromatic polyamide fibers. These fibers are characterized by a tensile strength of greater than 100,000 psi, a tensile modulus of greater than two million psi, and a decomposition temperature of greater than 200° C. The fibers may be used in the form of continuous tows (1000 to 400,000 filaments each), woven cloth, whiskers, chopped fiber or random mat. The preferred fibers are carbon fibers, aromatic polyamide fibers, such as Kevlar 49 fiber (obtained from E.I. duPont de Nemours, Inc., Wilmington, DE), and silicon carbide fibers.

The compositions contain 5 to 60 weight percent, preferably 15 to 50 percent, of hardener (i.e., component a), 10 to 60 percent, preferably 15 to 50 percent, of component b, and 3 to 85 percent, preferably 20 to 80 percent by weight of component c.

The preimpregnated reinforcement of this invention may be prepared by several techniques known in the art, such as wet winding or hot melt. To make impregnated tow or undirectional tape, the fiber is passed into a bath of the epoxy/hardener mixture. A non-reactive, volatile solvent such as dichloroethane may be optionally included in the resin bath to reduce viscosity. After impregnation, the reinforcement is passed through a die to remove excess resin, sandwiched between plies of release paper, passed through a set of heated rollers, cooled, and taken up on a spool. It is used within a few days or may be stored for months at 0° F.

During prepreg manufacture, the resin system "B-stages", or partially advances.

In some applications it may be desirable to prereact a portion of the epoxy resin with the hardener prior to prepreg manufacture. For example, if an epoxy blend containing 80 percent by weight of bis(2,3-epoxycyclopentyl)ether and 20 percent of a liquid bisphenol A resin is reacted with 4,4'-bis-(4-amino phenoxy)diphenyl sulfone, it is beneficial to prereact the hardener with the bisphenol A epoxy resin prior to addition of bis(2,3-epoxycyclopentyl)ether. The prereacted epoxy/hardener mixture has a lower melting point than the pure hardener, making it easier to blend with the remaining portion of the epoxy blend.

Composites may be prepared by curing preimpregnated reinforcement using heat and pressure. Vacuum bag/autoclave cures work well with these compositions. Laminates may also be prepared via wet layup followed by compression molding, resin transfer molding, or by resin injection, as described in European Patent Application No. 0019149, published Nov. 26, 1980. Typical cure temperatures are 100° F. to 500° F., preferably 180° F. to 450° F.

The compositions of this invention are well suited for filament winding. In this composite fabrication process, continuous reinforcement in the form of tape or tow—either previously impregnated with resin or impregnated during winding—is placed over a rotating and removable form or mandrel in a previously determined pattern. Generally the shape is a surface of revolution and contains end closures. When the proper number of layers are applied, the wound form is cured in an oven or autoclave and the mandrel removed.

For making preimpregnated tape with tack and drape, the preferred resin composition contains greater than 60 percent by weight of bis(2,3-epoxycyclopentyl)ether in the epoxide component and the hardener of Formula I (i.e., 4,4'-bis(3-aminophenoxy)diphenyl sulfone). If additional tack is required, glycidyl amines such as N,N-diglycidyl aniline or N,N,N',N'-tetraglycidyl 4,4'-diaminodiphenyl methane may be used as a coepoxide. In general, prepreg shelf life increases as the proportion of cycloaliphatic epoxy resin in the epoxy component increases. Coepoxides such as bisphenol A epoxy resins of Formula II where n=0 to 5, or epoxidized novolak resins such as III or IV where n=0 to 4 may be blended with bis(2,3-epoxycyclopentyl)ether for this application.

For filament winding and wet layup, the preferred resin composition comprises epoxy resins selected from bis (2,3-epoxycyclopentyl) ether, bisphenol A epoxy resins of Formula II, where n=0 to 6, and epoxidized novolak resins of Formulas III and IV, where n=0 to 3. The preferred epoxy resin mixtures have viscosities less than 50,000 centipoises at 70° C. Consequently, bis-(2,3-epoxycyclopentyl) ether may be completely replaced by other epoxy resins in some preferred filament winding formulations.

For all prepreg and composite formulations, the preferred molar ratio of N-H groups in the hardener to 1,2-epoxide groups in the epoxy resin is 0.6 to 1.5.

The compositions of this invention may be used as aircraft parts such as wing skins, wing-to-body fairings, floor panels, flaps, radomes; as automotive parts such as driveshafts, bumpers, and springs; and as pressure vessels, tanks and pipes. They are also suitable for protective armor on military vehicles and sporting goods applications such as golf shafts, tennis rackets, and fishing rods.

In addition to structural fibers, the composition may also contain particulate filler/reinforcement such as talc, mica, calcium carbonate, aluminum trihydrate, glass microballoons or spheres, phenolic thermospheres, carbon black, asbestos, wollastonite, and kaolin. Up to half of the weight structural fiber in the composition may be replaced by filler and/or particulate reinforcement.

EXAMPLES

The following examples serve to give specific illustrations of the practice of this invention but they are not intended in any way to limit the scope of this invention.

In the examples which follow, the epoxy equivalent weight (EEW) is defined as the grams of epoxy resin per mole of 1,2 epoxide group.

EXAMPLE 1

An epoxy resin blend was prepared by heating together 1600 g of a bisphenol A epoxy resin (EEW 189) with 2400 g of bis(2,3-epoxycyclopentyl) ether at 50° C. for 1 hour. A thermosetting epoxy resin formulation was prepared by combining 981 g of this solution with 900 g of 4,4'-bis(3-aminophenoxy)diphenyl sulfone.

EXAMPLE 2

A thermosetting epoxy resin formulation was prepared by blending 80.0 g of a bisphenol A epoxy resin (EEW 189) with 46.3 g of 4,4'-bis(3-aminophenoxy)-diphenyl sulfone.

EXAMPLE 3

An epoxy resin blend was prepared by combining 47.2 g of a bisphenol A epoxy resin (EEW 189) and 28.4 g of bis(2,3-epoxycyclopentyl)ether at 50° C. This solution was blended with 60 g of 4,4'-bis(3-aminophenoxy)-diphenyl sulfone to make a thermosetting epoxy resin formulation.

EXAMPLE 4

An epoxy resin blend was prepared by combining 20.9 g of bis(2,3epoxycyclopentyl)ether with 47.7 g of N,N,N',N'-tetraglycidyl-4,4'-diamino diphenyl methane (Araldite MY-720 obtained from Ciba-Geigy Corporation, Ardsley, N.Y.). This blend was combined with 60.0 g of 4,4'-bis(3-aminophenoxy)diphenyl sulfone to make a thermosetting epoxy resin formulation.

EXAMPLE 5

An epoxy resin blend was prepared by combining 39.2 g of bis(2,3-epoxycyclopentyl)ether with 26.2 g of a bisphenol A epoxy resin (EEW 189) at 50° C. A thermosetting epoxy formulation was prepared by combining this blend with 60 g of 4,4'-bis(4-aminophenoxy)-diphenyl sulfone.

EXAMPLE 6

A thermosetting epoxy formulation was prepared by combining 55.0 g of bis(2,3-epoxycyclopentyl) ether with 65.1 g of 4,4'-bis(3-aminophenoxy)diphenyl sulfone.

EXAMPLE 7

A thermosetting epoxy formulation was prepared by combining 58.1 g of bis (2,3-epoxycyclopentyl) ether with 66.0 g of 4,4'-bis(4-aminophenoxy)diphenyl sulfone.

EXAMPLE 8

A 5 liter flask equipped with a paddle stirrer, nitrogen inlet, thermometer with a Therm-o-Watch controller, Claisen adapter, 12-inch jacketed Vigreux column, Barrett trap, water cooled condenser, a nitrogen inlet, and an electric heating mantle was charged with the following materials:
  415 g of potassium carbonate,
  574 g of 4,4-dichlorodiphenyl sulfone,
  600 ml of toluene, and
  1400 ml of N,N-dimethyl acetamide.

The mixture was stirred, purged with nitrogen, and heated to 80° C. Then 229 g of m-aminophenol and 229 g of p-aminophenol were added. The temperature of the mixture was raised to 155°–160° C. and held there as toluene and a toluene/water azeotrope were collected in the trap. A small amount of toluene was continually recycled as the mixture was maintained at 160° C. for 10 hours.

The mixture was then cooled to 70° C. and filtered. A 350 g portion of the filtrate was charged to a 5 liter flask containing 2 liters of methanol. This solution was heated and stirred at reflux as 1300 g of water was added over a 1 hour period. Following addition of water, heating was discontinued, but agitation continued as the contents cooled to room temperature (about 25° C.).

The cooled mixture contained a tan granular solid, which was recovered on a filter, washed once with hot water, and dried in a vacuum oven. The final product weighed 133 g and had a melting range of 150°–163° C. It was a mixture of 4,4'-bis(4-aminophenoxy)diphenyl sulfone, 4,4'-bis(3-aminophenoxy)diphenyl sulfone and 4-(3-aminophenoxy)-4'-(4-aminophenoxy)diphenyl sulfone.

EXAMPLE 9

An epoxy blend was prepared by combining 39.2 g of bis(2,3-epoxycyclopentyl)ether and 26.2 g of a bisphenol A epoxy resin (EEW 189) at 50° C. A thermosetting epoxy formulation was prepared by combining the blend with 60.0 g of the product of Example 8.

EXAMPLES 10 to 17

Unreinforced castings were prepared from the formulations described in Examples 1 through 7 and 9. Typical castings weighed 100 to 160 g and were made using the proportions given in the above Examples. Casting dimensions were ⅛×8×5 to 8 inches.

The general procedure for making castings was as follows: The epoxy resin was charged to a 3-necked flask equipped with a paddle stirrer. The contents of the flask were heated to 120° C. to 130° C. and stirred as the amine hardener was added as a fine powder. The hardener dissolved in about five minutes. The resulting solution was subjected to a vacuum of about 25 inches of mercury for three minutes with agitation, followed by two minutes without agitation. It was then poured into a glass mold with a cavity of dimensions ⅛"×8"×8", and cured with a programmed heating cycle: 16 to 21 hours at 105° C., 8 hours at 140° C., and finally 16 hours at 175° C.

Castings were tested to determine tensile properties, heat deflection temperature and water sensitivity. For the latter, the change in weight on immersion of tensile bars in 160° F. water after two weeks was recorded. Tensile properties were measured according to ASTM D-638 using a Type 1 dogbone specimen. Heat deflection temperatures were measured according to ASTM D-648 (264 psi stress).

Table I summarizes the properties of unreinforced castings. These materials have low water sensitivity and high tensile moduli compared to castings of many other epoxy formulations.

TABLE I

| PROPERTIES OF UNREINFORCED CASTINGS | | | | | | | | |
|---|---|---|---|---|---|---|---|---|
| CASTING EXAMPLE | 10 | 11 | 12 | 13[b] | 14 | 15 | 16[c] | 17 |
| RESIN FORMULATION EXAMPLE | 1 | 2 | 3 | 4 | 5 | 6 | 7 | 9 |
| TENSILE STRENGTH ($10^3$ psi) | 10.3 | 13.2 | 8.4 | 7.5 | 12.2 | 11.6 | 9.1 | 9.6 |
| TENSILE MODULUS ($10^5$ psi) | 5.5 | 4.0 | 4.2 | 6.0 | 4.9 | 6.1 | 5.1 | 5.8 |
| ELONGATION (%) | 2.2 | 6.7 | 2.3 | 1.5 | 4.2 | 2.3 | 2.2 | 2.1 |
| HEAT DEFLECTION TEMPERATURE (°C.) | 170 | 168 | 157 | 221 | 194 | 175 | 201 | 175 |
| WATER UPTAKE (%)[a] | 2.5 | 1.4 | — | 5.2 | 2.6 | 2.9 | 3.5 | 2.8 |

[a]After immersion for 2 wks at 160° F.
[b]Cure Schedule: 16 hr at 130° C., 5 hr at 150° C., 4 hr at 170° C., plus 16 hr at 200° C.
[c]Cure Schedule: 20 hr at 104° C., 8.5 hrs at 138° C., plus 12 hr at 175° C.

Example 18 decribes the preparation of unidirectional epoxy/graphite prepreg.

EXAMPLE 18

The resin formulation described in Example 1 was prepared by adding the hardener to the epoxy resin over a 20 minute period while maintaining the mixture at 110° C. The formulation was then cooled to 70° C. and poured into a shallow pan on a prepreg machine. A six inch wide ribbon of 110 carbon fiber tows each containing 6,000 filaments, was impregnated with resin in the bath and then passed through a slot die with dimensions of six inches by about 0.014 inches in order to remove excess resin. The impregnated tape was sandwiched between release paper and passed through a prepreg machine. The finished tape contained about 55 percent by weight of fiber. The fiber was a PAN-based carbon fiber with a tensile strength of $5.0 \times 10^5$ psi, tensile modulus of $34 \times 10^6$ psi, and a yield of 0.39 grams per meter.

Example 19 describes the preparation and properties of a cured laminate.

EXAMPLE 19

A unidirectional laminate was prepared by stacking 8 plies of the preimpregnated tape made in Example 18 in a mold, covering them with a teflon impregnated spacer and bleeder cloths, and enclosing them in a nylon bag. The entire assembly was placed in a autoclave and cured. A control prepreg made with the same fiber but a different epoxy resin system was also cured in the autoclave using the manufacturer's recommended cure schedule. The laminates were tested to determine longitudinal tensile and compressive properties. Tensile properties were measured according to ASTM-D3039. Compressive properties were measured using a modified ASTM-D695 procedure. Unidirectional graphite/epoxy tabs were added to prevent the sample ends from crushing in a noncompressive failure mode. A gage length of approximately 0.190 inches was used. End tabs on compressive samples were adhered using FM-300 film adhesive (obtained from American Cyanamid, Havre de Grace, MD) which was cured at 177° C. for 1 hr. Table II summarizes laminate properties.

It is clear from this data that the prepreg composition of this invention afford composites with higher tensile and compressive properties than the Control. Furthermore, the hot/wet compressive strength of the composite of this invention is excellent.

TABLE II

| LONGITUDINAL PROPERTIES OF UNIDIRECTIONAL LAMINATES[a] | | |
|---|---|---|
| EXAMPLE | 19 | CONTROL[c] |
| PREPREG EXAMPLE | 18 | — |
| CURE SCHEDULE[b] | I | II |
| TENSILE STRENGTH ($10^3$ psi) | 282 | 251 |
| TENSILE MODULUS ($10^6$ psi) | 20.8 | 20.7 |
| STRAIN TO FAILURE (%) | 1.33 | 1.17 |
| COMPRESSIVE STRENGTH ($10^3$ psi)[d] | | |
| TEST CONDITION | | |
| ROOM TEMPERATURE | 278 | 244 |
| HOT/WET[e] | 208 | —[f] |

[a]Normalized to 60 volume percent fiber
[b]Cure Schedule I
Apply vacuum inside bag
Heat autoclave from room temperature to 135° C. at 2° C./min. Hold 90 min at 135° C. Apply 85 psi to autoclave. Hold 105 min at 135°. Release vacuum to bag. Heat autoclave from 135° C. to 179° at 1° C./min. Hold at 179° C. for 2 hr.
Cure Schedule II
Apply vacuum inside bag
Apply 85 psi to autoclave. Heat autoclave from room temperature to 121° at 3° C./min Hold 60 min at 121° C. Increase autoclave pressure to 100 psi Release vacuum inside bag. Heat autoclave from 121° C. to 178° C. at 2.5° C./min. Hold at 178° C. for 8 hr. Decrease pressure to 15 psi into hold.
[c]Unidirectional tape made with a commercial resin system (3501-6 from Hercules, Inc., Wilmington, DE) based on tetraglycidyl methylene dianiline and 4,4'-diaminodiphenyl sulfone.
[d]Measured between 1000 and 6000 microinches strain.
[e]After 2 weeks immersion in 160° F. water. Test temperature: 200° F.
[f]Not determined

What is claimed is:

1. A composition comprising:
(a) a diamine hardener represented by the following general formula:

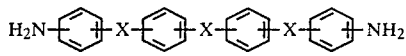

wherein the X's are independently selected from a direct bond, O, S, SO₂, CO, COO, C(CF₃)₂ and C(R₁R₂)₂ wherein R₁ and R₂ are independently hydrogen or alkyl of 1 to 4 carbon atoms,
(b) an epoxy resin containing two or more 1,2-epoxide groups per molecule, and
(c) a structural fiber having a tensile strength of greater than 100,000 psi, a tensile modulus of greater than two million psi and a decomposition temperature of greater than 200° C.

2. A composition as defined in claim 1 wherein the diamine is of the formula:

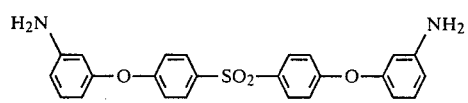

3. A composition as defined in claim 1 wherein the diamine is of the formula:

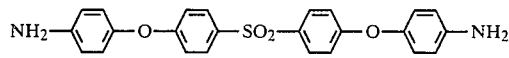

4. A composition as defined in claim 1 wherein the diamine is of the formula:

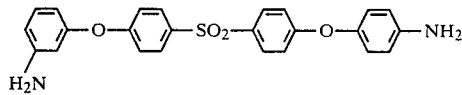

5. A composition as defined in claim 1 wherein the diamine is of the formula:

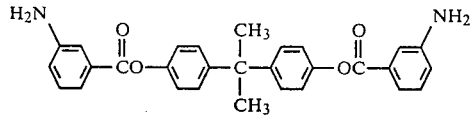

6. A composition as defined in claim 1 wherein the diamine is of the formula:

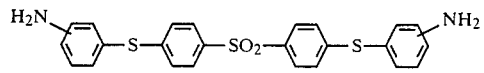

7. A composition as defined in claim 1 wherein the diamine is of the formula:

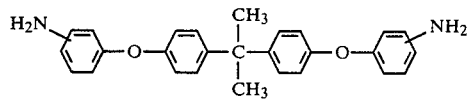

8. A composition as defined in claim 1 wherein the diamine is of the formula:

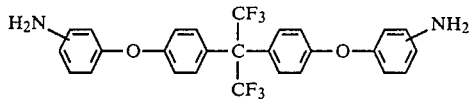

9. A composition as defined in claim 1 wherein the diamine is of the formula:

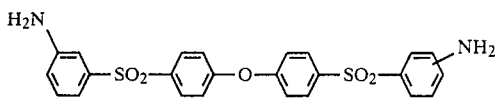

10. A composition as defined in claim 1 wherein the epoxy resin is bis(2,3-epoxycyclopentyl) ether.

11. A composition as defined in claim 1 wherein the epoxy resin is of the following structure:

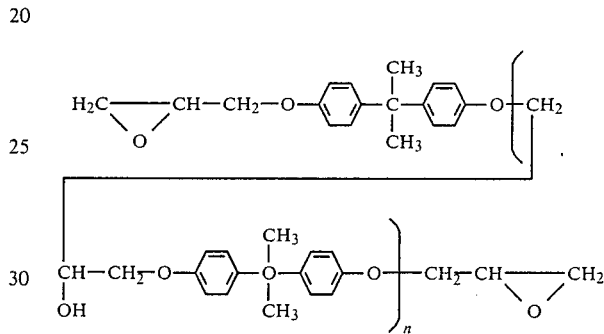

where n has a value from about 0 to about 15.

12. A composition as defined in claim 1 wherein the epoxy resin is a phenol-formaldehyde novolak of the following formula:

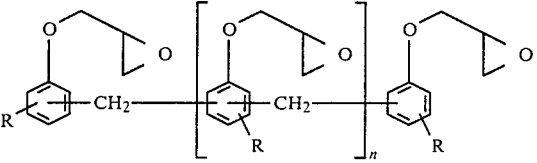

where n=0.1 to 8 and R=hydrogen.

13. A composition as defined in claim 1 wherein the epoxy resin is a cresol-formaldehyde novolak of the formula:

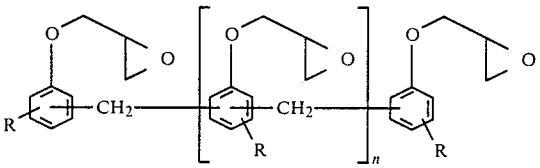

where n=0.1 to 8 and R is CH₃.

14. A composition as defined in claim 1 wherein the epoxy resin is N,N,N',N'-tetradycidyl4,4'-diaminodiphenyl methane.

15. A composition as defined in claim 1 wherein the epoxy resin is N,N,N',N'-tetraglycidylxylylene diamine.

16. A composition as defined in claim 1 wherein the epoxy resin in N,N-diglycidyl toluidene.

17. A composition as defined in claim 1 wherein the epoxy resin is N,N-diglycidyl aniline.

18. A composition as defined in claim 1 wherein the epoxy resin is N,N,N',N'-tetraglycidylbis(methylamino)cyclohexane.

19. A composition as defined in claim 1 wherein the epoxy resin is diglycidyl isophthalate.

20. A composition as defined in claim 1 wherein the epoxy resin is diglycidyl terephthalate.

21. A composition as defined in claim 1 wherein the epoxy resin is O,N,N-triglycidyl-4-amino phenol.

22. A composition as defined in claim 1 wherein the epoxy resin is 3,4-epoxycyclohexylmethyl 3,4-epoxycyclohexanecarboxylate.

23. A composition as defined in claim 1 wherein the epoxy resin is a N,N'-diglycidyl derivative of dimethylhydantoin.

24. A composition as defined in claim 1 wherein the structural fibers are selected from carbon, graphite, glass, silicon carbide, poly(benzothiazole), poly(benzimidazole), poly(benzoxazole), alumina, titania, boron, and aromatic polyamides.

25. A composition as defined in claim 1 which contains an accelerator which increases the rate of cure.

26. A composition as defined in claim 1 which contains 5 to 60 weight percent of component (a).

27. A composition as defined in claim 1 which contains 10 to 60 weight percent of component (b).

28. A composition as defined in claim 1 which contains 15 to 50 weight percent of component (c).

29. A composition comprising:
(a) a diamine hardener represented by the following general formula:

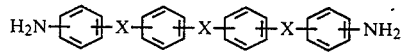

wherein the X's are independently selected from a direct bond, O, S, SO$_2$, CO, COO, C(CF$_3$)$_2$ and C(R$_1$R$_2$)$_2$ wherein R$_1$ and R$_2$ are independently hydrogen or alkyl of 1 to 4 carbon atoms,
(b) bis(2,3-epoxycyclopentyl)ether, and
(c) a structural fiber having a tensile strength of greater than 100,000 psi, a tensile modulus of greater than two million psi and a decomposition temperature of greater than 200° C.

30. A prepreg comprising:
(a) a diamine hardener represented by the following general formula:

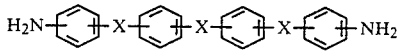

wherein the X's are independently selected from a direct bond, O, S, SO$_2$, CO, COO, C(CF$_3$)$_2$ and C(R$_1$R$_2$)$_2$ wherein R$_1$ and R$_2$ are independently hydrogen or alkyl or 1 to 4 carbon atoms,
(b) an epoxy resin containing two or more 1,2-epoxide groups per molecule, and
(c) a structural fiber having a tensile strength of greater than 100,000 psi, a tensile modulus of greater than two million psi and a decomposition temperature of greater than 200° C.

31. A prepreg as defined in claim 30 which contains an accelerator which increases the rate of cure.

32. A composite comprising:
(a) a cured epoxy resin containing two or more 1,2-epoxide groups per molecule hardened with
(b) a diamine hardener represented by the following general formula:

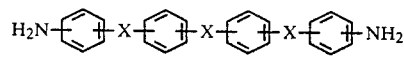

wherein the X's are independently selected from a direct bond, O, S, SO$_2$, CO, COO, C(CF$_3$)$_2$ and C(R$_1$R$_2$)$_2$ wherein R$_1$ and R$_2$ are independently hydrogen or alkyl of 1 to 4 carbon atoms, and
(c) a structural fiber having a tensile strength of greater than 100,000 psi, a tensile modulus of greater than two million psi and a decomposition temperature of greater than 200° C.

33. A composite as defined in claim 32 wherein the epoxy resin was cured in the presence of an accelerator which increased the rate of cure.

34. A prepreg which contains the composition of claim 29.

35. A cured article prepared from the composition of claim 29.

36. A composition comprising:
(a) a diamine hardener represented by the following formula:

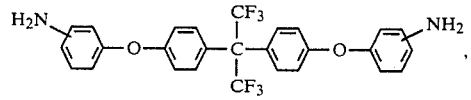

(b) an epoxy resin containing two or more 1,2-epoxide groups per molecule, and
(c) a structural fiber having a tensile strength of greater than 100,000 psi, a tensile modulus of greater than two million psi and a decomposition temperature of greater than 200° C.

37. A cured article prepared from the composition of claim 30.

* * * * *